United States Patent [19]

Samis et al.

[11] 4,298,621

[45] Nov. 3, 1981

[54] CONVERTING ANIMAL WASTES TO USEFUL PRODUCTS

[75] Inventors: James M. Samis, Oklahoma City; Walter C. Waechter, Edmond; Ronald D. James, Oklahoma City, all of Okla.

[73] Assignee: Thermonetics, Inc., Oklahoma City, Okla.

[21] Appl. No.: 157,785

[22] Filed: Jun. 9, 1980

[51] Int. Cl.$^3$ ............................................... A23K 1/00
[52] U.S. Cl. ........................................ 426/55; 426/59; 426/635; 426/807; 210/621
[58] Field of Search ..................... 426/55, 56, 59, 807; 210/2, 3; 435/68, 272

[56] References Cited

U.S. PATENT DOCUMENTS

| | | | |
|---|---|---|---|
| 3,787,583 | 1/1974 | Hruby | 426/59 X |
| 3,838,198 | 9/1974 | Bellamy et al. | 426/56 |
| 3,838,199 | 9/1974 | Coe et al. | 426/55 |
| 3,846,559 | 11/1974 | Stevens | 426/59 X |
| 3,878,303 | 4/1975 | Hashimoto | 426/56 |
| 3,973,043 | 8/1976 | Lynn | 426/55 |

Primary Examiner—Robert A. Yoncoskie
Attorney, Agent, or Firm—C. Clark Dougherty, Jr.

[57] ABSTRACT

A process for simultaneously converting swine, poultry and cattle wastes to useful products comprising combining said wastes with water to form a slurry, removing feathers and grit from said slurry, subjecting said slurry to anaerobic fermentation for a period of time to produce a methane-containing gas stream and a slurry containing a partially fermented solid residue, separating the methane-containing gas stream from the slurry, separating partially fermented solid residue from the slurry and drying the partially fermented solid residue to form a feed product therefrom. The quantitative ratio of cattle wastes containing cellulosic or fibrous materials to the poultry and swine wastes containing more rapidly fermentable materials is controlled to thereby control the pH of the slurry during anaerobic fermentation. At least a portion of the methane-containing gas stream produced is utilized as fuel for carrying out the drying step.

12 Claims, 1 Drawing Figure

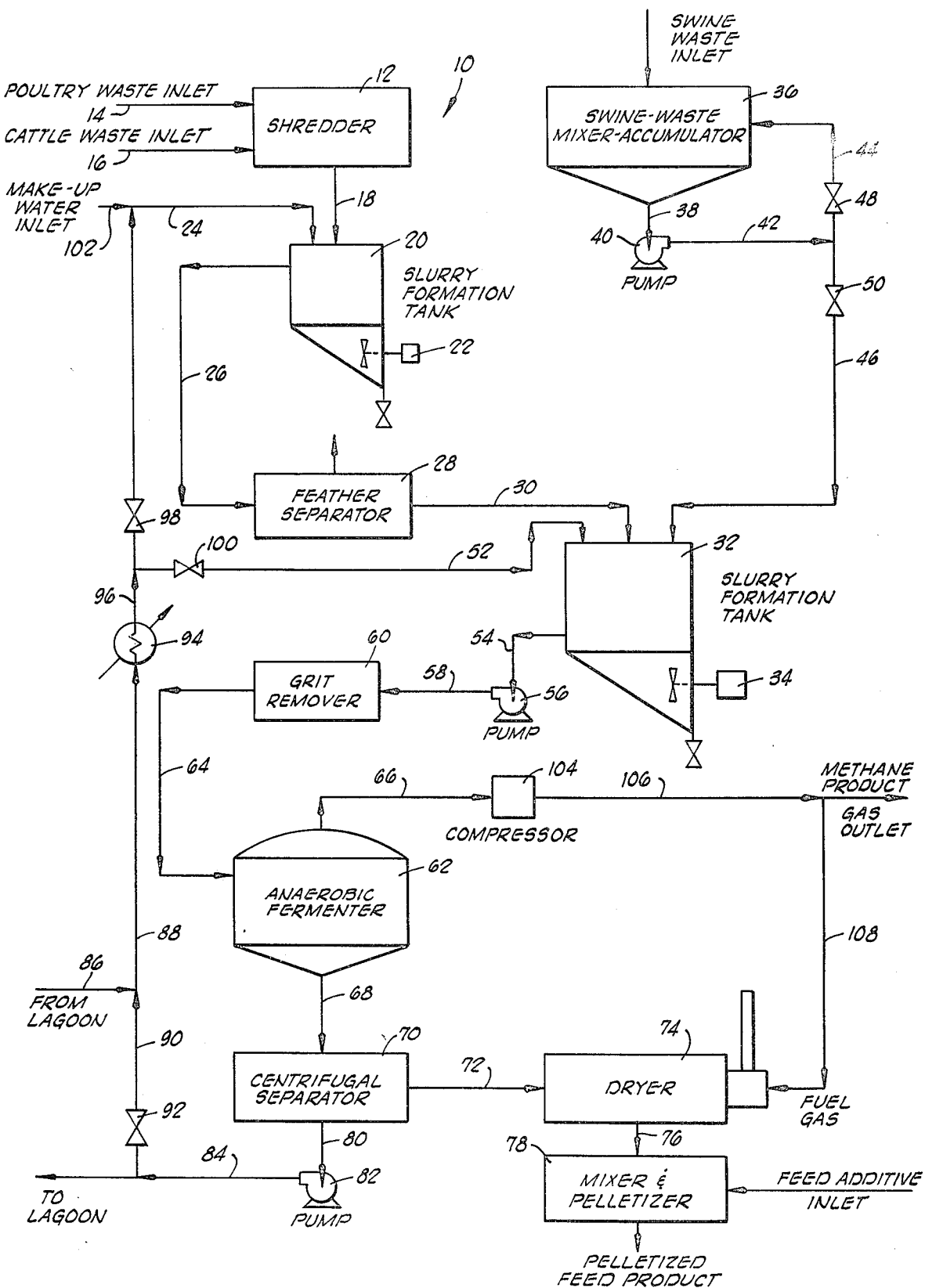

CONVERTING ANIMAL WASTES TO USEFUL PRODUCTS

BACKGROUND OF THE INVENTION

1. Field of the Invention

The present invention relates generally to converting animal wastes to useful products, and more particularly, but not by way of limitation, to a process for simultaneously converting swine, poultry and cattle wastes to methane-containing gases and an animal feed product.

2. Description of the Prior Art

Various processes for converting animal wastes into more valuable and useful products have been developed heretofore. For example, U.S. Pat. No. 3,838,199 discloses a process wherein cattle manure is combined with water to form a slurry and the slurry subjected to thermophilic anaerobic fermentation to produce a methane gas product and an animal feed product. U.S. Pat. No. 3,973,043 discloses a similar process for converting feedlot fecal waste materials into methane and animal feed. U.S. Pat. No. 3,878,303 discloses a method for the treatment of animal wastes wherein an aqueous medium containing the animal wastes is prepared and a foam stabilizer such as a surface active agent or a protective colloid is added to the resulting aqueous medium. The aqueous medium is then foamed and the foam charged to a fermentation vessel to permit bacterial decomposition of the animal wastes.

By the present invention an improved process for simultaneously converting swine, poultry and cattle wastes to methane-rich gases and a feed product is provided which is efficient and economical to carry out.

SUMMARY OF THE INVENTION

A process for simultaneously converting swine, poultry and cattle wastes to useful products comprising the steps of combining water with the poultry and cattle wastes to form a mixed first slurry thereof, separating feathers from the first slurry, combining the swine wastes with the first slurry to form a mixed second slurry, removing grit from the second slurry, subjecting the second slurry to anaerobic fermentation for a period of time to produce a methane-containing gas stream and a third slurry containing partially fermented solid residue, separating the methane-containing gas stream and the partially fermented solid residue from the third slurry and drying the partially fermented solid residue to form a feed product therefrom.

It is, therefore, a general object of the present invention to provide a process for simultaneously converting swine, poultry and cattle wastes to useful products.

A further object of the present invention is the provision of a process for simultaneously converting swine, poultry and cattle wastes to useful products which is efficient and economical to carry out.

Yet a further object of the present invention is the provision of an economical process for converting swine, poultry and cattle wastes to methane-containing gas and a pelletized protein rich feed product.

Other and further objects, features and advantages of the invention will be readily apparent to those skilled in the art upon a reading of the description of preferred embodiments which follows when taken in conjunction with the accompanying drawing.

BRIEF DESCRIPTION OF THE DRAWING

In the drawing forming a part of this disclosure, the process of the present invention is illustrated schematically.

DESCRIPTION OF PREFERRED EMBODIMENTS

Referring now to the drawing, a system for carrying out the process of the invention is illustrated and generally designated by the numeral 10. The system 10 includes a shredder 12 for shredding and particulating poultry and cattle wastes conveyed to the process. While the shredder 12 can be of various conventional designs, it preferably is of a design similar to a hammer mill whereby the wastes are shredded and particulated continuously. Poultry wastes are conveyed to the shredder 12 by a conveyor 14 and cattle wastes are conveyed thereto by a conveyor 16. The resulting shredded and particulated poultry and cattle wastes are conveyed by a conveyor 18 or otherwise introduced into a first slurry formation tank 20 which is of conventional design and includes at least one agitator 22.

An aqueous carrier liquid, the source of which will be described further hereinbelow, is introduced into the slurry formation tank 20 by way of a conduit 24 connected thereto and the shredded and particulated wastes are mixed and suspended in the carrier liquid within the slurry formation tank 20 by the agitator 22. The resulting slurry containing the waste materials as well as feathers and grit is withdrawn from the slurry formation tank 20 by way of a conduit 26 connected thereto. The term "grit" is used herein to mean sand, soil, stones, rocks and other relatively heavy insoluble impurities contained in the incoming waste materials. The conduit 26 conducts the slurry to a feather separator 28 wherein feathers are removed from the slurry. The feather separator 28 can take various forms but preferably is a conventional rotoscreen apparatus which separates the feathers from the slurry by size classification. From the rotoscreen apparatus 28 the slurry is conducted by a conduit 30 to a second slurry formation tank 32 which is of conventional design and includes an agitator 34 disposed therein.

Swine wastes are conducted to a swine waste mixer-accumulator tank 36. A conduit 38 connected to the bottom of the tank 36 conducts the swine wastes to the inlet of a pump 40 and the discharge of the pump 40 is connected to a conduit 42. The conduit 42 is connected to a pair of conduits 44 and 46 which include flow control valves 48 and 50 disposed therein, respectively. The conduit 44 recycles a portion of the swine wastes back to the tank 36 whereby the wastes are continuously circulated and mixed. The conduit 46 leads the remaining swine wastes pumped from the tank 36 by the pump 40 to the slurry formation tank 32. An aqueous carrier liquid is conducted to the slurry formation tank 32 by a conduit 52 connected thereto. The defeathered slurry containing poultry and cattle wastes entering the tank 32 by way of the conduit 30 are mixed with the swine wastes entering the tank 32 by way of the conduit 46 and the additional aqueous carrier fluid entering the tank 32 by way of the conduit 52 to form a mixed second slurry.

The quantity of cattle wastes which contain relatively high levels of cellulosic or fibrous materials in the mixed second slurry is controlled so that cattle wastes are present therein in an amount in the range of from about 5% to about 30% by weight of total fermentable solids in the second slurry. Such quantity is controlled by varying the rates of poultry and cattle wastes conveyed to the shredder 12 and the rate of swine wastes pumped into the slurry formation tank 32 using conventional conveyor speed and flow rate control apparatus (not shown) in conjunction with the conveyors 14 and 16 and flow control valves 48 and 50. Poultry and swine wastes do not contain high levels of cellulosic or fibrous materials.

The slurry of swine, poultry and cattle wastes formed in the slurry formation tank 32 is withdrawn therefrom by way of a conduit 54 connected to the tank 32. The conduit 54 leads the slurry to the suction of a pump 56, the discharge of which is connected by a conduit 58 to a grit remover apparatus 60. The grit remover apparatus 60 can take various forms, but preferably is comprised of one or more conventional cyclone separators which function to remove the grit from the slurry by centrifugal separation as the slurry flows through the apparatus.

The resulting slurry having feathers and grit removed therefrom is conducted from the grit remover apparatus 60 to an anaerobic fermentation vessel 62 by a conduit 64 connected therebetween. The fermentation vessel 62 is of conventional design and is airtight so that oxygen is excluded therefrom. Preferably, the vessel 62 includes means for constantly agitating the slurry therewithin and has a slurry retention such that about 50% of the solid waste materials in the slurry are biologically converted to a methane-containing gas mixture. As the anaerobic fermentation process is carried out, the methane-containing gas mixture produced in the vessel 62 is withdrawn therefrom by a conduit 66 connected to the top portion thereof. The methane-containing gas stream is comprised of approximately 60% by volume methane, 39% by volume carbon dioxide, and 1% by volume other gases.

The vessel 62 is operated at a pressure of about 0.36 psig and the temperature of the fermenting slurry within the vessel 62 is controlled at a level in the range of from about 85° F. to about 100° F., preferably 95° F. by controlling the temperature of the slurry entering the vessel 62. As previously described, the quantitative ratio of cellulosic (fibrous) materials to other fermentable waste materials in the slurry is controlled. The non-cellulosic fermentable materials contained in the slurry rapidly form acids upon fermentation and the cellulosic materials therein function as a buffer whereby the pH of the slurry within the vessel 62 is maintained at a level in the range of from about 6.8 to about 7.6. If the pH of the fermenting slurry is allowed to reach too low a level, i.e., a pH below about 6.8, the fermentation rate is slowed down to an inefficient level. Thus, by controlling the quantity of cattle wastes contained in the slurried mixture of cattle, poultry and swine wastes entering the vessel 62, the pH of the slurry within the vessel is controlled at a level which results in an efficient rate of fermentation. If necessary, pH control additives can be combined with the slurry by introducing the additives into the slurry formation tank 32, but the inclusion of a proper quantity of cellulosic materials in the slurry eliminates or reduces the quantity of such additives required.

A third slurry, i.e., the slurry effluent from the tank 62 containing a partially fermented solid residue is withdrawn from the tank 62 by way of a conduit 68 connected thereto which conducts the slurry to conventional centrifuge apparatus 70. While flowing through the centrifuge apparatus 70, a major portion of the residual solids contained in the third slurry is removed therefrom in the form of a fine particle cake having a high protein content. Such cake is conducted from the centrifuge apparatus 70 by a conveyor 72 to a gas fired dryer 74 wherein the cake is dried to a moisture content in the range of from about 12% to about 35% by weight. The dried cake is conveyed from the dryer 74 by a conveyor 76 to a mixer and pelletizer apparatus 78 wherein feed ingredients such as cottonseed meal, soybean meal, urea and grains are combined with the cake and the resulting mixture pelletized to produce a pelletized animal feed product.

The third slurry effluent is withdrawn from the centrifuge apparatus 70 by a conduit 80 which is connected to the suction of a conventional pump 82. The discharge of the pump 82 is connected to a conduit 84 which leads the effluent to a lagoon (not shown) wherein solids remaining therein are allowed to settle therefrom. The resulting clarified aqueous liquid is pumped from the lagoon by way of a conduit 86 into a conduit 88 connected thereto. A bypass conduit 90 having a flow control valve 92 disposed therein is connected between the conduits 84 and 86 for allowing a portion of the aqueous liquid effluent from the centrifuge apparatus 70 to bypass the lagoon. The conduit 88 leads the aqueous liquid to a heater 94 wherein the liquid is heated. From the heater 94 the liquid is conducted by a conduit 96 to the conduits 24 and 52 having flow control valves 98 and 100 disposed therein, respectively. The flow control valves 98 and 100 are adjusted so that all or a major portion of the liquid flows by way of the conduit 24 into the slurry formation tank 20 wherein it is utilized to slurry the poultry and cattle wastes therein and a minor portion (if required) of the liquid flows by way of the conduit 52 into the slurry formation tank 32 wherein it is utilized to form the slurry therein. Makeup water required is added to the system 10 by a conduit 102 connected to the conduit 24.

The heater 94 can take various forms, but preferably is a gas fired heater or boiler system which utilizes the methane-containing product gas from the fermentation vessel 62 as fuel. The aqueous liquid flowing through the heater 94 is heated to a temperature such that the slurry entering the fermentation vessel 62 is at the desired temperature, i.e., a temperature in the range of from about 85° F. to about 100° F., preferably 95° F.

The methane-containing gas stream withdrawn from the fermentation vessel 62 is conducted by the conduit 66 to a conventional gas compressor 104 which compresses the gas stream to a pressure in the range of from about 6 to about 10 psig. A portion of the compressed gas stream is conducted by a conduit 108 connected to the conduit 106 to the dryer 74 wherein it is utilized as fuel for the dryer. As indicated above, another portion of the methane-containing product gas stream can be utilized as fuel for the heater 94 with the remaining portion of the stream being conducted by the conduit 106 to a pipeline for transportation to a point of use or further processing.

In order to facilitate a clear understanding of the process of the present invention, the following example is given.

EXAMPLE 1,320,000 lbs/day of poultry waste having a moisture content in the range of from about 60% to about 80% by weight and 200,000 lbs/day of dairy cattle waste having a moisture content in the range of from about 65% to about 85% by weight are conducted to the shredder 12 wherein they are particulated and shredded and conducted by way of the conveyor 18 to the slurry formation tank 22. 2,708,617 lbs/day of aqueous carrier fluid are conducted to the tank 22 resulting in 4,228,617 lbs/day of first slurry conducted to the feather separator 28 by way of the conduit 26. 3,667 lbs/day of feathers are removed from the first slurry in the apparatus 28 resulting in 4,224,950 lbs/day of first slurry being conducted to the slurry formation tank 32 by way of the conduit 30. 1,980,000 lbs/day of swine waste are conducted to the tank 32 resulting in the formation of a 6,204,950 lbs/day second slurry in the tank 32 containing a quantity of cattle wastes of 6% by weight of the total fermentable solids therein. 18,333 lbs/day of grit are removed from the second slurry in the grit remover apparatus 60 resulting in 6,136,617 lbs/day of second slurry being conducted to the anaerobic fermentation vessel 62.

At winter ambient air conditions, i.e., an average ambient temperature of 0° F., the aqueous carrier fluid conducted to the slurry formation tanks 32 and/or 20 is heated by the heater 94 to a temperature in the range of from about 105° F. to about 110° F., resulting in the second slurry within the anaerobic fermentation tank 62 having a temperature of about 95° F. While undergoing fermentation in the tank 62, the slurry therein has a temperature of about 95° F., a pressure of about 0.36 psig, and because of the controlled quantity of cattle waste materials to poultry and swine waste materials, a pH of 7.2 without the addition of pH control additives. 4,267,000 cu.ft./day of methane-containing gas are withdrawn from the vessel 62 by way of the conduit 66 and 5,800,690 lbs/day of third slurry containing partially fermented solids are withdrawn from the vessel 62 by way of the conduit 68. 1,176,188 lbs/day of partially fermented solid residue are separated from the third slurry in the centrifugal separator apparatus 70 and withdrawn therefrom by way of the conveyor 72. The solid residue is dried to a moisture content of from about 12% to about 35% by weight in the dryer 74 and 367,559 lbs/day of dried solid residue are conveyed by way of the conveyor 76 to the mixer and pelletizer 78. 150,441 lbs/day of various feed ingredients are combined with the solid residue resulting in the production of 518,000 lbs/day pelletized feed product.

4,624,502 lbs/day of liquid effluent from the centrifugal separator apparatus 70 are withdrawn therefrom the 73,512 lbs/day of residual solids are removed therefrom in the lagoon resulting in 2,708,617 lbs/day of liquid carrier fluid being conducted through the heater 94 wherein it is heated to a temperature of about 100° F. 2,708,617 lbs/day of the heated liquid carrier fluid flows by way of the conduit 24 to the slurry formation tank 20. The 4,267,000 cu.ft./day stream of methane-containing gas withdrawn from the vessel 62 by way of the conduit 66 has a calorific value of 645 BTU/cu.ft. and is compressed in the compressor 104 to a pressure of 10 psig. 2,400,000 cu.ft./day of the methane-containing gas stream flow by way of the conduit 108 to the dryer 74 wherein it is utilized as fuel gas and 80,000 cu.ft./day of the methane-containing gas stream is utilized as fuel gas for the heater 94 leaving a 1,787,000 cu.ft./day stream of methane-containing gas which is conducted to a pipeline for transportation to a point of use or further processing.

Thus, a self-sustaining economical process for converting swine, poultry and cattle wastes to useful products is provided which attains the objects, ends and advantages mentioned as well as those inherent therein. While numerous changes can be made in the arrangement of steps and apparatus used to carry out the process, such changes are encompassed within the spirit of the present invention as defined by the appended claims.

What is claimed is:

1. A process for simultaneously converting swine, poultry and cattle wastes to useful products comprising the steps of:
   (a) combining water with said poultry and cattle wastes to form a mixed first slurry thereof;
   (b) separating feathers from said first slurry;
   (c) combining said swine wastes with said first slurry to form a mixed second slurry containing cattle wastes in the range of about 5% to about 30% by weight of the total fermentable solids;
   (d) removing grit from said second slurry;
   (e) subjecting said second slurry to anaerobic fermentation for a period of time such that a significant portion of the solid waste materials in said second slurry are converted to a methane-containing gas stream and such that a third slurry is produced containing a partially fermented solid residue;
   (f) separating said methane-containing gas stream from said third slurry;
   (g) separating partially fermented solid residue from said third slurry forming a solid residue portion and a remaining portion of said third slurry; and
   (h) drying said partially fermented solid residue to form a feed product therefrom.

2. The process of claim 1 further comprising the step of shredding said poultry and cattle wastes prior to combining water therewith to form said first slurry.

3. The process of claim 2 further comprising the step of using said remaining portion of said third slurry from step (g) to form said first slurry in step (a) and said second slurry in step (c).

4. The process of claim 3 further comprising the step of controlling the quantitative ratio of cattle wastes to swine and poultry wastes in said second slurry to thereby control the ratio of cellulosic or fibrous materials contained in said second slurry such that the pH of said second slurry is buffered to above about 6.8 by said cellulosic or fibrous materials during step (e).

5. The process of claim 4 further comprising the step of utilizing at least a portion of said methane-containing gas stream as fuel for carrying out step (h).

6. The process of claim 5 further comprising the step of combining one or more feed supplements to feed product of step (h).

7. The process of claim 6 further comprising the step of pelletizing said feed product.

8. A process for simultaneously converting swine, poultry and cattle wastes to useful products comprising the steps of:
   (a) Combining water with said poultry and cattle wastes to form a mixed first slurry thereof;
   (b) separating feathers from said first slurry;
   (c) combining said swine waste with said first slurry to form a mixed second slurry, said cattle, poultry and swine wastes being combined in said first and second slurries in amounts such that the quantitative ratio of cellulosic or fibrous materials to other fermentable materials in said second slurry is controlled at a level which functions as a buffer to maintain the ph of said second slurry in the range of from about 6.8 to about 7.6;

(d) removing grit from said second slurry;

(e) subjecting said second slurry to anaerobic fermentation for a period of time to produce a methane-containing gas stream and a third slurry containing a partially fermented solid residue;

(f) separating said methane-containing gas stream from said third slurry;

(g) separating partially fermented solid residue from said third slurry forming a solid residue portion and a remaining portion of said third slurry;

(h) drying said partially fermented solid residue;

(i) combining one or more feed ingredients with said dried solid residue; and (j) pelletizing said dried solid residue feed ingredient mixture to form a pelletized feed product.

9. The process of claim 8 further comprising the step of shredding said poultry and cattle wastes prior to combining water therewith to form said first slurry.

10. The process of claim 9 further comprising the step of using said remaining portion of said third slurry from step (g) to form said first slurry in step (a) and said second slurry in step (e).

11. The process of claim 10 further comprising the step of heating said third slurry prior to using said third slurry to form said first and second slurries such that said second slurry is at a temperature in the range of from about 85° F. to about 100° F. in step (e).

12. The process of claim 11 further comprising the step of utilizing at least a portion of said methane-containing gas streams as fuel for carrying out the steps of heating said third slurry and drying said partially fermented solid residue.

* * * * *